United States Patent [19]

Maegawa et al.

[11] Patent Number: 6,067,607
[45] Date of Patent: May 23, 2000

[54] DATA CONTROL SYSTEM FOR A COMPUTER'S MAIN MEMORY FOR EFFICIENTLY REALIZING VIRTUALIZATION OF LIST STRUCTURE DATA LYING ACROSS A REAL MEMORY SPACE AND A VIRTUAL MEMORY SPACE

[75] Inventors: Hirotoshi Maegawa; Hiroyuki Yasuda, both of Kanagawa-ken, Japan

[73] Assignee: Sony Corporation, Tokyo, Japan

[21] Appl. No.: 08/117,337

[22] Filed: Sep. 3, 1993

Related U.S. Application Data

[63] Continuation of application No. 07/548,989, filed as application No. PCT/JP89/01249, Dec. 13, 1989, abandoned.

[30] Foreign Application Priority Data

Dec. 14, 1988 [JP] Japan .................................. 63-315652
Mar. 10, 1989 [JP] Japan .................................... 1-59390

[51] Int. Cl.$^7$ .................................................. G06F 12/00
[52] U.S. Cl. ............................................................ 711/203
[58] Field of Search .................................... 395/427, 650; 711/203

[56] References Cited

U.S. PATENT DOCUMENTS

| | | | |
|---|---|---|---|
| 4,104,718 | 8/1978 | Poublan et al. | 395/600 |
| 4,253,145 | 2/1981 | Goldberg | 364/200 |
| 4,558,413 | 12/1985 | Schmidt et al. | 395/600 |
| 4,761,746 | 8/1988 | Tano et al. | 395/64 |
| 4,775,932 | 10/1988 | Oxley et al. | 395/600 |
| 4,783,752 | 11/1988 | Kaplan et al. | 395/64 |
| 4,807,120 | 2/1989 | Courts | 395/600 |
| 4,814,971 | 3/1989 | Thatte | 364/200 |
| 4,831,541 | 5/1989 | Eshel | 364/200 |
| 4,882,691 | 11/1989 | Schor | 395/64 |
| 4,890,240 | 12/1989 | Loeb et al. | 395/64 |
| 4,905,138 | 2/1990 | Bourne | 395/650 |
| 4,907,151 | 3/1990 | Bartlett | 364/200 |
| 4,912,629 | 3/1990 | Shuler, Jr. | 395/600 |
| 4,914,590 | 4/1990 | Loatman et al. | 364/419 |
| 4,922,414 | 5/1990 | Holloway et al. | 395/400 |
| 4,951,225 | 8/1990 | Lee et al. | 395/64 |
| 4,956,791 | 9/1990 | Lee et al. | 395/64 |
| 5,008,786 | 4/1991 | Thatte | 364/200 |
| 5,088,036 | 2/1992 | Ellis et al. | 395/425 |
| 5,109,336 | 4/1992 | Guenther et al. | 395/474 |
| 5,146,599 | 9/1992 | Kojima et al. | 395/800 |
| 5,261,088 | 11/1993 | Baird et al. | 395/600 |
| 5,301,287 | 4/1994 | Herrell et al. | 395/412 |
| 5,438,674 | 8/1995 | Keele et al. | 395/412 |

FOREIGN PATENT DOCUMENTS 0 171 934 A2  2/1986  European Pat. Off. .

OTHER PUBLICATIONS

Patent Abstracts of Japan, vol. 12, No. 388 (P–771), Oct. 17, 1988, and JP–A–63 131 247 (Fujitsu Ltd.), Jun. 3, 1988.
"Local Concurrent Error Detection & Correction in Data Structures Using Virtual Back Pointers", Li et al., Oct. 1987, pp. 1–37.
"Multi–Level Data Structures, Segmentation & Paging" Hubbold et al. 1974, pp. 245–251.
"Aspects of Reference Locality in List Structures in Virtual Memory", Baecker, Software Practice & Experience, Jul. 1973, pp. 245–253.

Primary Examiner—David L. Robertson
Attorney, Agent, or Firm—Limbach & Limbach L.L.P.

[57] ABSTRACT

A data control system for a computer's main memory for efficiently realizing virtualization of list structure data lying across a real memory space and a virtual memory space, including a real memory space having nodes linked by pointers, with the pointers being represented by addresses in the real memory space, a virtual memory space having nodes linked by pointers, with the pointers being represented by addresses in the virtual memory space and addresses to the real memory space, and wherein the nodes in the virtual memory space are referenced to the nodes in the real memory space by indirect pointers, and wherein the list data are shifted between the real memory space and the virtual memory space in the form of list structure units.

2 Claims, 13 Drawing Sheets

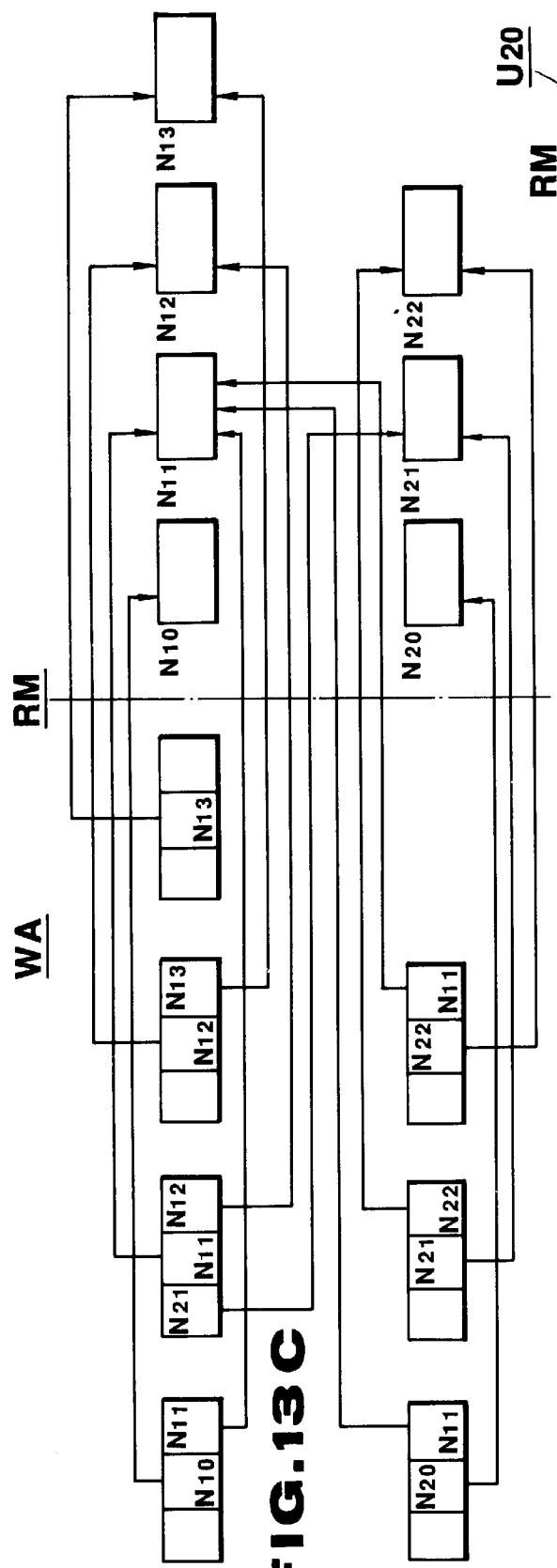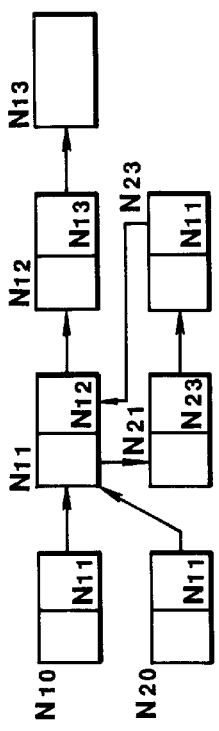
FIG.13C
FIG.13D
FIG.13E

DATA CONTROL SYSTEM FOR A COMPUTER'S MAIN MEMORY FOR EFFICIENTLY REALIZING VIRTUALIZATION OF LIST STRUCTURE DATA LYING ACROSS A REAL MEMORY SPACE AND A VIRTUAL MEMORY SPACE

This is a continuation of application Ser. No. 07/548,989 filed on Jul. 23, 1990 now abandoned, which is a 371 filing of PCT/JP89/01249 filed Dec. 13, 1989.

BACKGROUND OF THE INVENTION

1. Field of the Invention

This invention relates to a main memory data control or management system in a computer and, more particularly, to such a system for efficiently realizing virtualization of list structure data which are basic and indispensable in the field of symbol manipulation, such as artificial intelligence, formula manipulation or natural language manipulation.

2. Description of the Related Art

In general, in the field of symbol manipulation, such as artificial intelligence, formula processing or natural language processing, the desired symbolic manipulation is performed under control or management of data items of the list structure in a memory.

Up to now, the organization of the data of the list structure has been by means of so-called pointer-linked data in which nodes are linked together by pointers. With such pointer-linked data, a so-called binary tree structure is most popular, in which each pointer usually acts only in one direction and each node has its own data and pointers, usually two pointers, for referencing other nodes.

For example, in a LISP language, known as a representative language handling data items of the list structure, an example, of data of the list structure is shown in FIG. 1, in which each of intermediate nodes $N_{10}$, $N_{12}$, $N_{14}$, $N_{15}$, $N_{17}$, $N_{20}$, $N_{22}$, $N_{24}$ and $N_{26}$ has two pointers, while concrete data all carried by terminal nodes $N_{11}$, $N_{13}$, $N_{16}$, $N_{18}$, $N_{19}$, $N_{21}$, $N_{23}$, $N_{25}$, $N_{27}$ and $N_{28}$, with the information being carried by the state of construction of the terminal nodes.

For handling the data of the list structure in a memory, the nodes $N_{10}$, $N_{11}$, $N_{12}$, $N_{13}$, . . . are represented in a memory space M provided with addresses, and the pointers are indicated by the addresses in the memory space M, as shown for example in FIG. 2, for computerized control of the above data.

Meanwhile, the data of the list structure handled in the field of symbol manipulation may be joined together, disconnected, expanded or contracted and thus present a dynamic structure and a trial-and-error type behavior in which the information given as the data structure is changed multifariously.

Also, when such data of the list structure is controlled in the memory by a computer, the data structure becomes scattered in the memory and new nodes in the memory may be lost or used-up so that unnecessary data may be produced. These unnecessary nodes are recovered and re-used as new nodes by way of a garbage collection.

In case of a shortage of the real memory space despite such garbage collection, the memory space M may be expanded by using a virtual memory technique, that is by virtualization. For example, as shown in FIGS. 3 and 4, the memory space is controlled or managed on a page-by-page basis, and thus a page-by-page data swapping is performed between the real memory space RM and the virtual memory space IM.

It will be noted that the current computer architecture is designed to process local data having a static structure and is not suited to manipulation of the data of the list structure used in the field of symbol manipulation. Thus an extremely long time interval is necessitated in executing the garbage collection in which the object of manipulation is scattered dynamically. On the other hand, for virtualizing the memory space, it has been customary to control the memory space on a page-by-page basis on the premise that the related data are at near-by locations. While the page represents a fixed area in the memory space, since the data of the list structure are changed dynamically, the structure is caused to lie across a plurality of pages in an intricate manner, thus resulting in frequent occurrences of page faults and a lowered efficiency. Above all, when garbage collection is performed with respect to the virtualized memory space, since the page-by-page data swapping is executed between the real memory space and the virtual memory space, the operational efficiency is lowered significantly.

In view of the above described status of the art, it is an object of the present invention to provide for efficient virtual storage of data of the list structure which are fundamental and indispensable in the field of symbol manipulation such as artificial intelligence, formula manipulation or natural language manipulation.

SUMMARY OF THE INVENTION

For accomplishing the above objects the present invention provides a data control system for a computer's main memory for efficiently realizing virtualization of list structure data lying across a real memory space and a virtual memory space, comprising a real memory space having nodes linked by pointers, with the pointers being represented by addresses in the real memory space, a virtual memory space having nodes linked by pointers, with the pointers being represented by addresses in the virtual memory space and addresses to the real memory space, and wherein the nodes in the virtual memory space are referenced to the nodes in the real memory space by indirect pointers, and means for shifting the list data between the real memory space and the virtual memory space in the form of list structure units.

With the data control system of the present invention, data of a structure in which the nodes are linked together by pointers are represented in both a real memory space and a virtual memory space by indicating the pointers in the real memory space by the addresses in the real memory space, by indicating the pointers in the virtual memory space by the addresses in the virtual memory space and by the addresses to the real memory space, and by indirect referencing from the nodes in the real memory space to the nodes in the virtual memory space. This obviates the necessity of expressing the whole memory space by pointers. On the other hand, by shifting the data having the nodes linked together by the pointers between the actual memory space and the virtual memory space with the list structure employing the link information as a unit, data control or management may be achieved without the necessity of statically dividing the dynamic data and with the dynamic data structure remaining intact.

BRIEF DESCRIPTION OF THE DRAWINGS

FIGS. 13A, 13B, 13C, 13D and 13E are diagrams for illustrating the operational sequence of the listing operation in the real memory space for listing in the list structure unit shown in FIG. 12 from the virtual memory space into the real memory space;

DESCRIPTION OF THE PREFERRED EMBODIMENT

Figure 1:
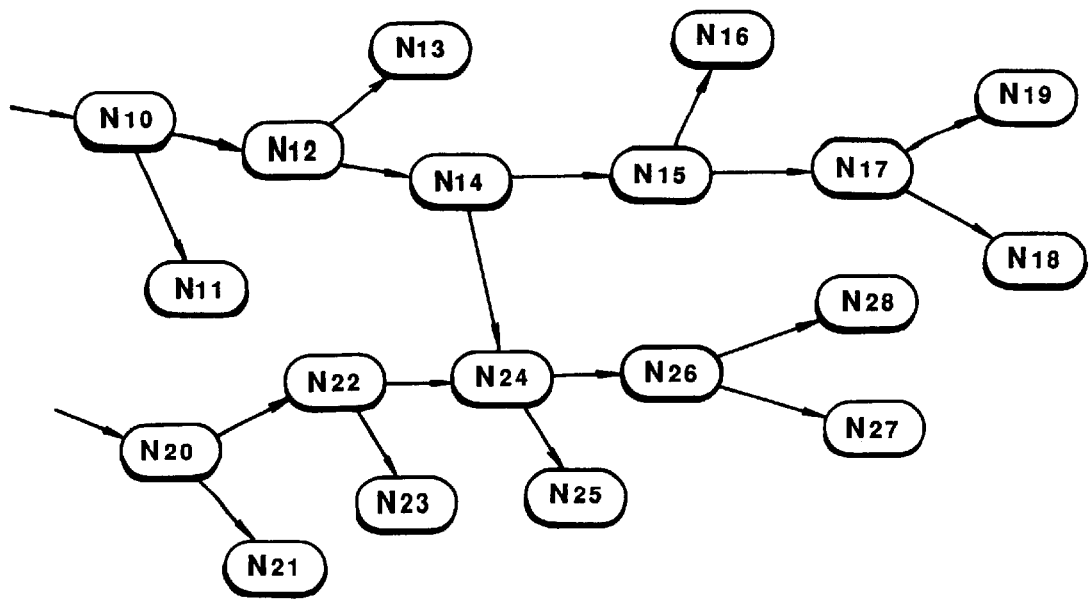
FIG. 1 is a diagram showing an example of data of a list structure in general.
Figure 2:
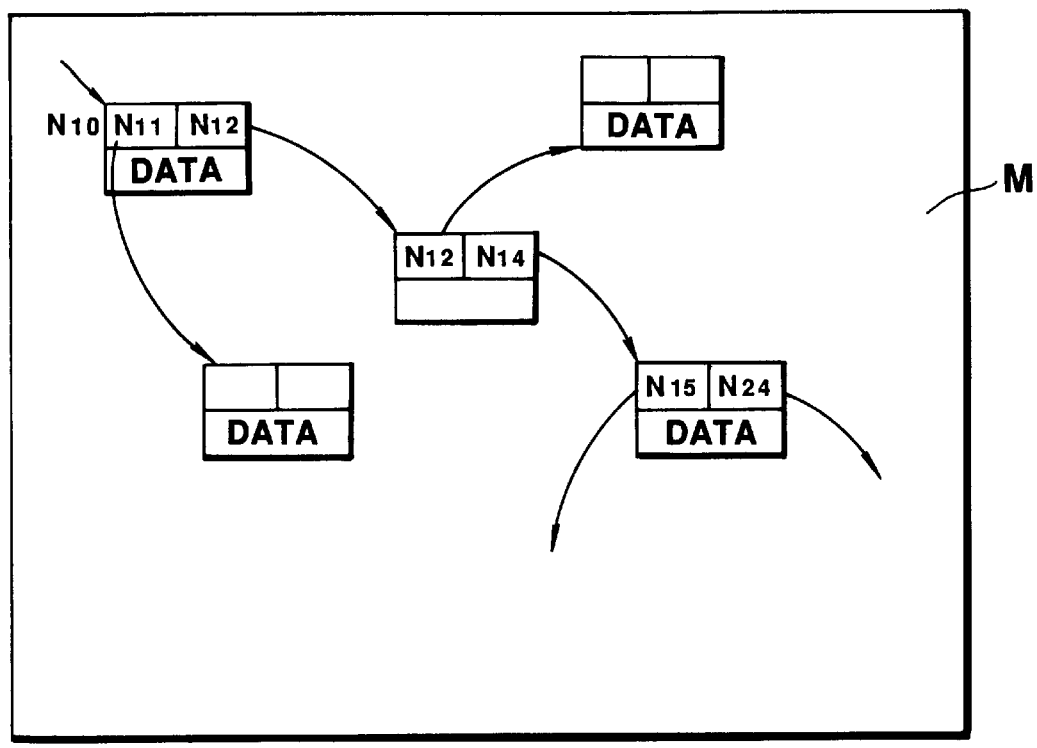
FIG. 2 is a diagram showing the data of the list structure in a memory space.
Figure 3:
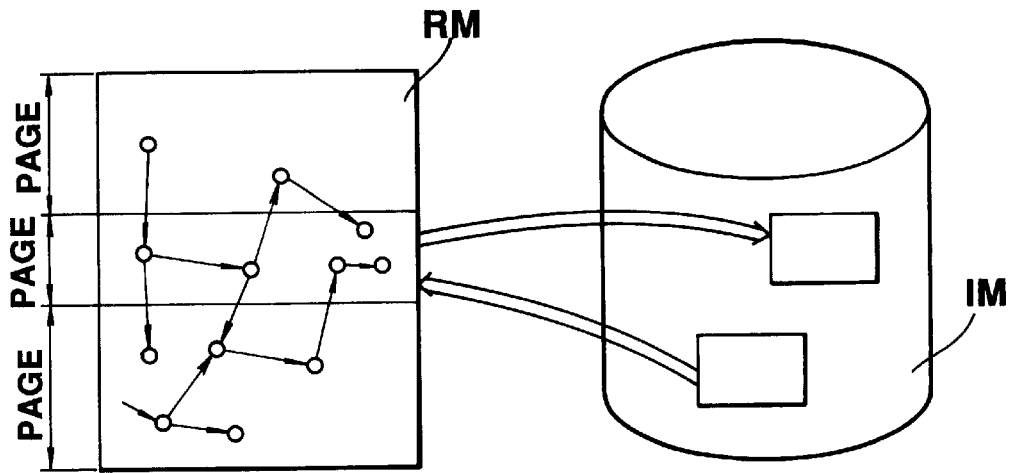
FIGS. 3 and 4 are diagrams showing an example of a memory space expanded by application of a conventional technique of a virtual memory.
Figure 4:
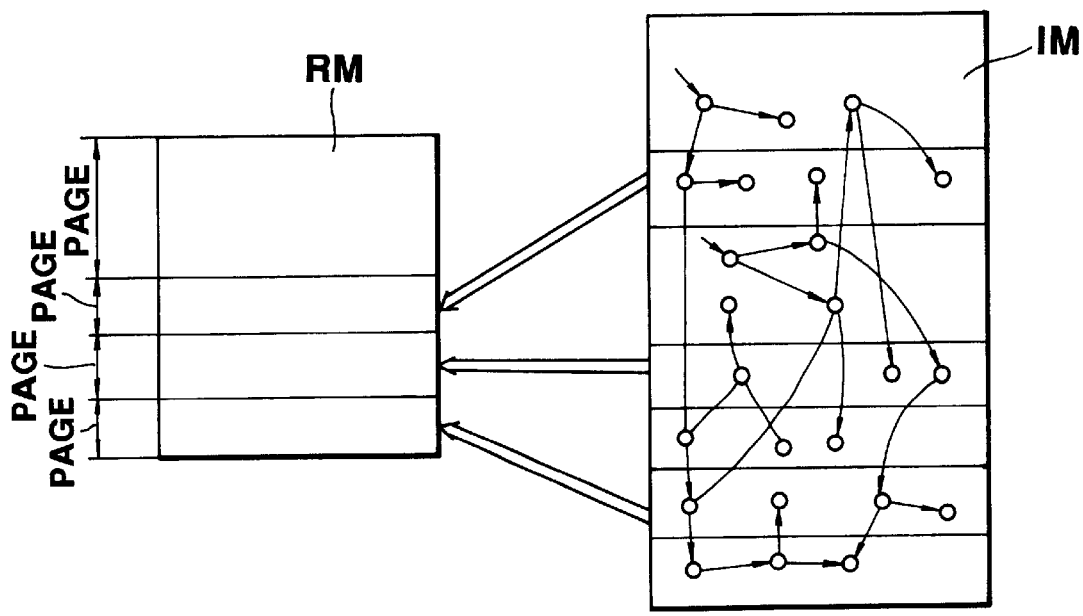

An embodiment of the present invention will be hereinafter explained by referring to the drawings.

Figure 5:
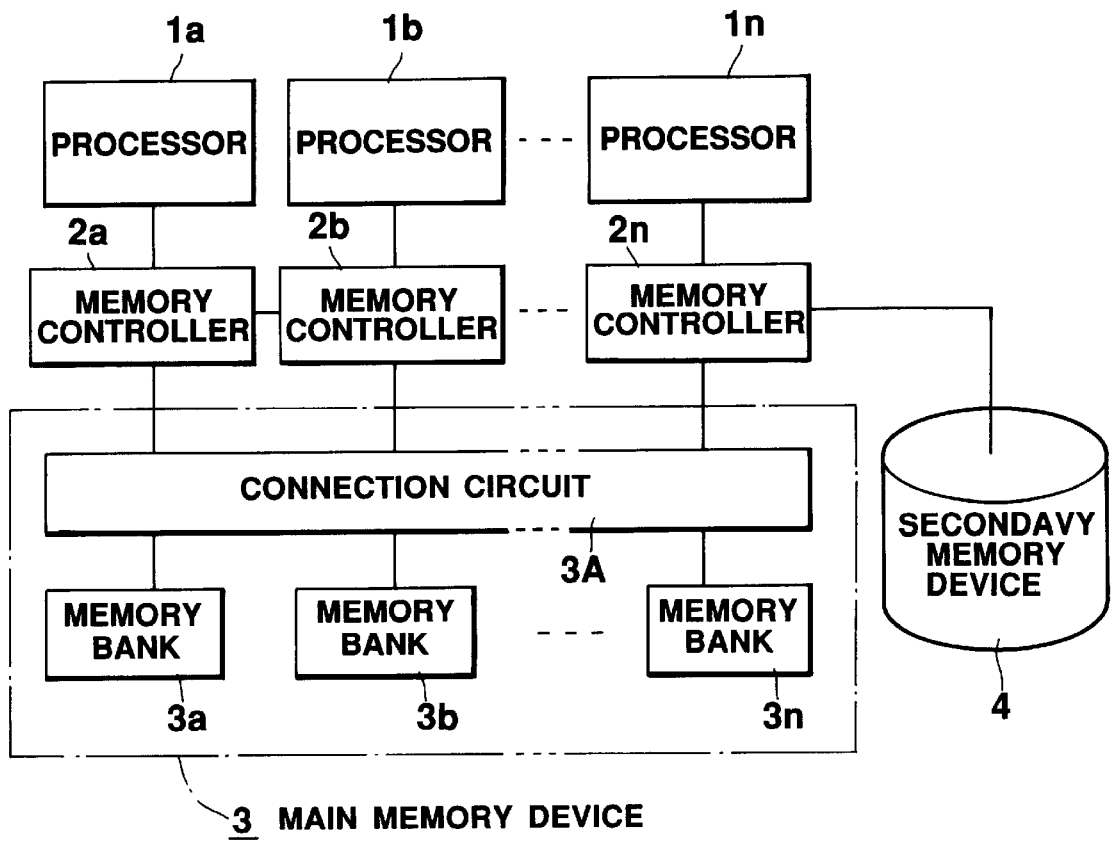
FIG. 5 is a block diagram showing the organization of a multiprocessor system to which the present invention is applied.

FIG. 5 is a block diagram showing a conceptual construction of a multiprocessor system for handling list type data under application of the data supervisory system of the present invention. This multiprocessor system is constituted by a main memory device 3 forming a real memory space accessed by a plurality of processors 1a, 1b, . . . , in by way of memory controllers 2a, 2b, . . . 2n and a secondary memory device 4, such as a hard disk device, forming a virtual memory space, for increasing the storage capacity by application of the virtual memory technique.

The main memory device 3 is constituted by a plurality of memory banks 3a, 3b, . . . 3n and a connection circuit 3A for these memory banks 3a, 3b, . . . 3n.

Figure 6:
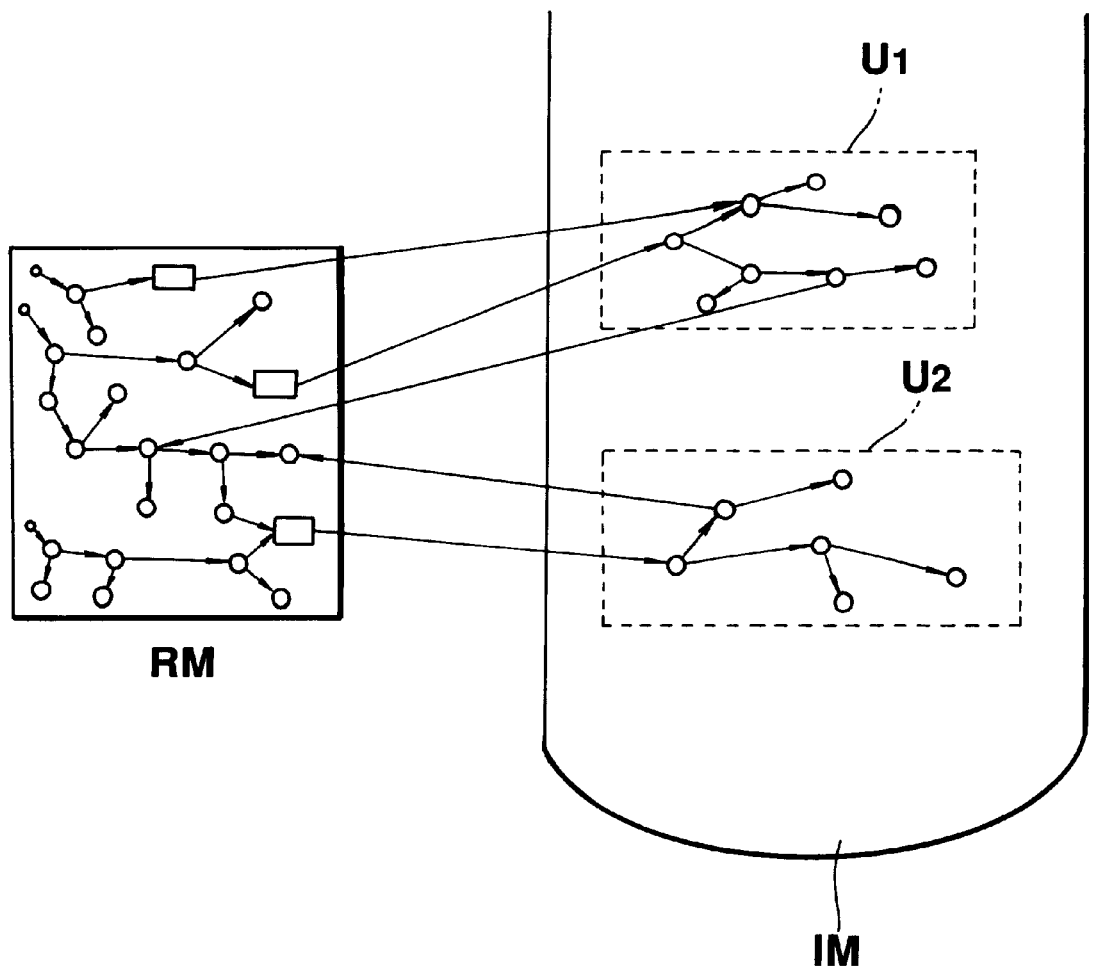
FIG. 6 is a diagram showing an example of data of the list structure handled in the processor system to which the present invention is applied, and which are represented in both the real memory space and the virtual memory space.

The list structure data handled by the present multiprocessor system are represented as the list structure data lying across a real memory space RM of the main memory device 3 and a virtual memory space IM of the secondary memory device 4 and having the nodes linked by pointers, as shown in FIG. 6, in which the pointers in the real memory space are represented by the addresses in the real memory space, the pointers in the virtual memory space are represented by addresses in the virtual memory space and by addresses to the real memory space, and the nodes in the virtual memory space are referenced from the nodes in the real memory space by indirect pointers. The list structure data are swapped between the real memory space RM and the virtual memory space IM in the form of list structure units $U_1$, $U_2$ shown within broken line rectangles in FIG. 6.

The nodes in the real memory space in which the indirect pointer referencing the node in the virtual memory space is established are indicated by rectangle marks, while the remaining nodes are indicated by circle marks.

The concrete examples of the list structure data will be hereinafter explained.

Figure 7:
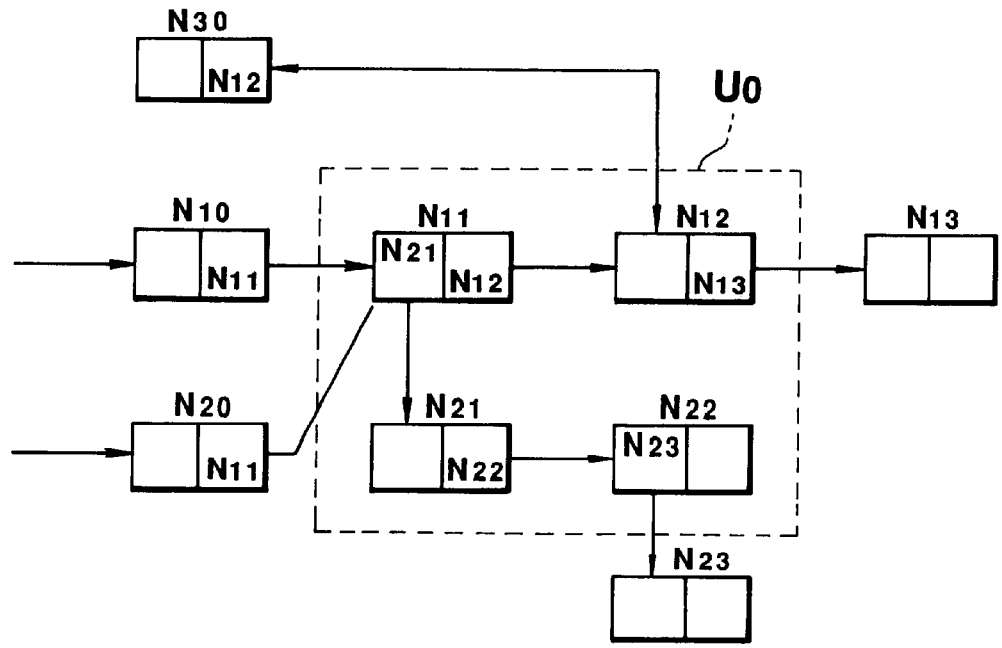
FIG. 7 is a diagram showing a concrete example of data of the list structure represented in the real memory space.
Figure 8:
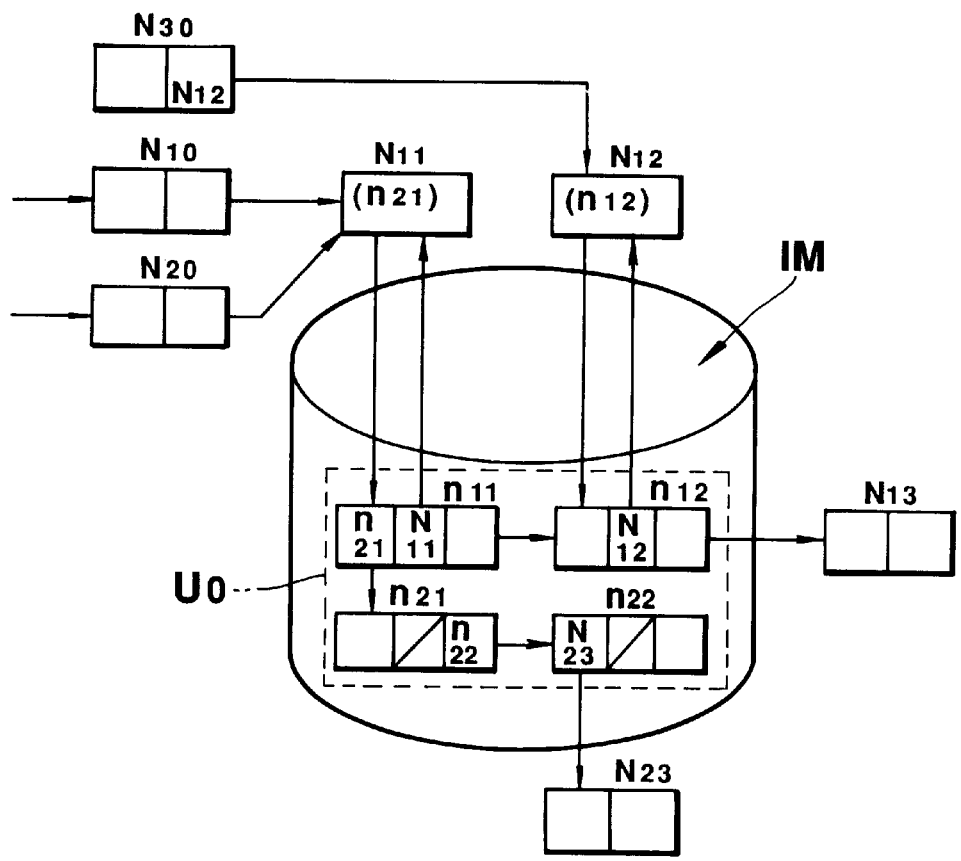
FIG. 8 is a diagram showing a concrete example of the data of the list structure shown in FIG. 7, represented in both the real memory space and the virtual memory space.

For example, the list structure data in which, as shown in FIG. 7, nine nodes $N_{10}$, $N_{11}$, $N_{12}$, $N_{13}$, $N_{20}$, $N_{21}$ $N_{22}$, $N_{23}$ and $N_{30}$, represented in the real memory space RM by the main memory 3, are linked together by real memory space addresses in the real memory space RM, may be represented as shown in FIG. 8 when the list structure unit $U_0$ constituted by the four nodes $N_{11}$, $N_{12}$, $N_{21}$ and $N_{22}$ shown within a broken line rectangle in FIG. 7 is moved into the virtual memory space IM by the auxiliary memory device 4.

Referring to FIG. 8, four nodes $n_{11}$, $n_{12}$, $n_{21}$ and $n_{22}$ constituting the above mentioned list structure unit $U_0$, thus moved into the virtual memory space IM, are linked by the virtual memory space addresses of the nodes $n_{21}$ and $n_{22}$ in the virtual memory space IM and the pointers directly indicating the real memory space addresses of the nodes $N_{11}$, $N_{12}$, $N_{13}$, and $N_{23}$ in the real memory space RM, with these nodes $n_{21}$, $n_{22}$, $N_{11}$, $N_{12}$, $N_{13}$ and $N_{23}$. On the other hand, the nodes $N_{11}$ and $N_{12}$ in the real memory space RM are linked, by indirect pointers indicating the virtual memory space addresses of the nodes $n_{11}$, $n_{12}$ of the list structure unit $U_0$ in the virtual memory space IM, with these nodes $n_{11}$ and $n_{12}$.

With the present system, in handling the data of the above described list structure, if (1) there are no necessary nodes in the above mentioned real memory space RM in the course of the dynamic changes of the list data, (2) list faults are produced, and (3) the nodes are in the above mentioned virtual memory space IM, the data of a series of units of the list structure, inclusive of the nodes, are swapped from the virtual memory space IM into the real memory space (RM) by way of a list-in operation in accordance with a procedure which will be described subsequently.

Also, with the present system, the number of the free nodes in the real memory space RM is monitored and, when the free nodes in the real memory space has become depleted, unnecessary nodes are recovered as free nodes by way of a garbage collecting operation. When the number of the free nodes exceeds a predetermined threshold value Sh as a result of this garbage collection, the operation reverts to the data processing per se. When the number of the free nodes does not exceed the predetermined threshold value Sh as a result of the garbage collection, pointers to the unnecessary list data are extracted at this time in the real memory space RM, and a list-out operation is performed in the real memory space RM for swapping out data of the list structure units from the real memory space RM to the virtual memory space IM.

When the number of data of the list structure units listed out in the real memory space RM is small and less than a predetermined threshold Ss, pointers to the unnecessary list data are listed out in the real memory space RM to repeatedly perform listing out of new list data in the real memory space RM. When the number of data of the list structure units listed out in the real memory space RM reaches the threshold value Ss, the data of the list structure units listed out in the real memory space RM are swapped out from the real memory space RM into the virtual memory space IM to terminate the listing-out operation to revert to data processing per se.

The listing-out operation from the real memory space RM to the virtual memory space IM is performed in the following manner with the use of indirect pointers by sweeping the list structures and by referencing to the number of the links of each node by a reference counter (not shown).

Figure 9:
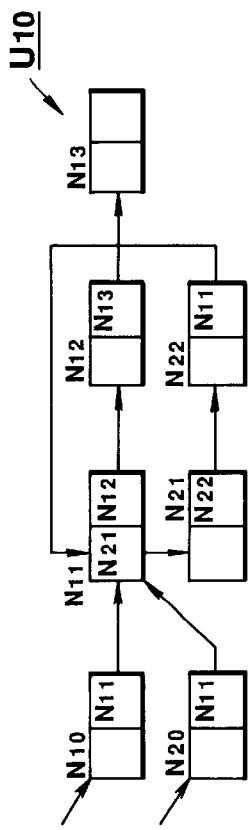
FIG. 9 is a diagram showing a constructional example of a list structure unit for listing out from the real memory space into the virtual memory space.

The following explanation is made for the case in which, as shown in FIG. 9, a unit of the list structure $U_{10}$ in which seven nodes $N_{10}$, $N_{11}$, $N_{12}$, $N_{13}$, $N_{20}$, $N_{21}$ and $N_{22}$ in the real memory space RM are interconnected by pointers is listed out from the real memory space RM into the virtual memory space IM. First of all, in the real memory space RM, the list structure unit $U_{10}$ is listed out on a work area WA of the real memory space RM in accordance with a procedure shown in FIG. 10A to FIG. 10F.

Figure 10A:
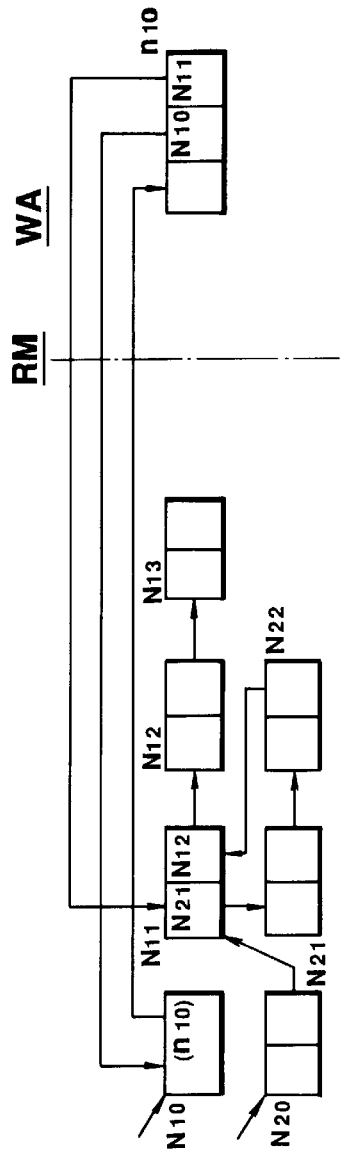
FIGS. 10A, 10B, 10C, 10D, 10E and 10F are diagrams for illustrating the operational sequence of listing out of the list structure unit shown in FIG. 9 from the real memory space into the virtual memory space.

First, attention is directed to a node at the start position of the list structure unit $U_{10}$ in the real memory space RM. As shown in FIG. 10A, a node $n_{10}$ having a reverse reference pointer indicating a link to the node $N_{10}$ by a real memory space address and a reverse reference pointer indicating a link to a node $N_{11}$ linked by the pointer of the node $N_{10}$ by a real memory space address is provided in the work area WA of the real memory space RM as the node for transfer to the virtual memory space IM. An indirect pointer indicating a link to the node $n_{10}$ for transfer to the virtual memory space IM is provided at the node $N_{10}$ in the real space memory RM.

Figure 10B:
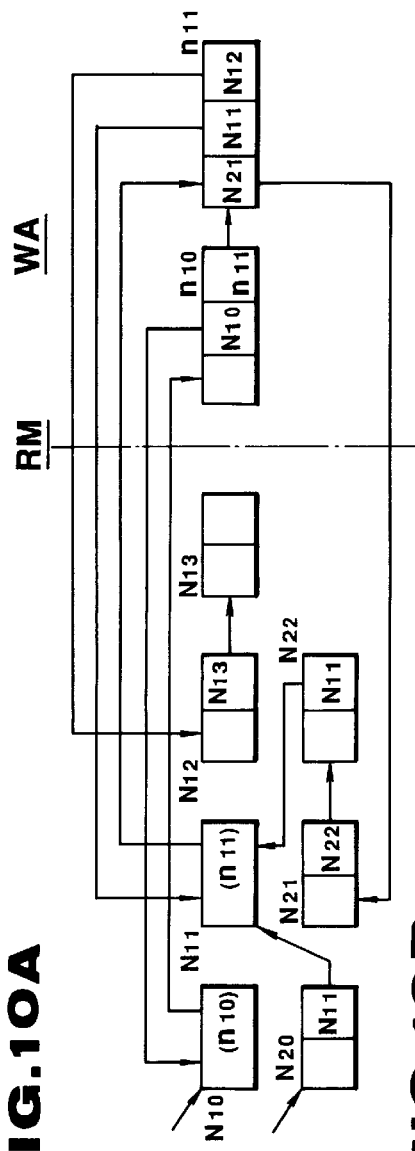
Figure 10C:
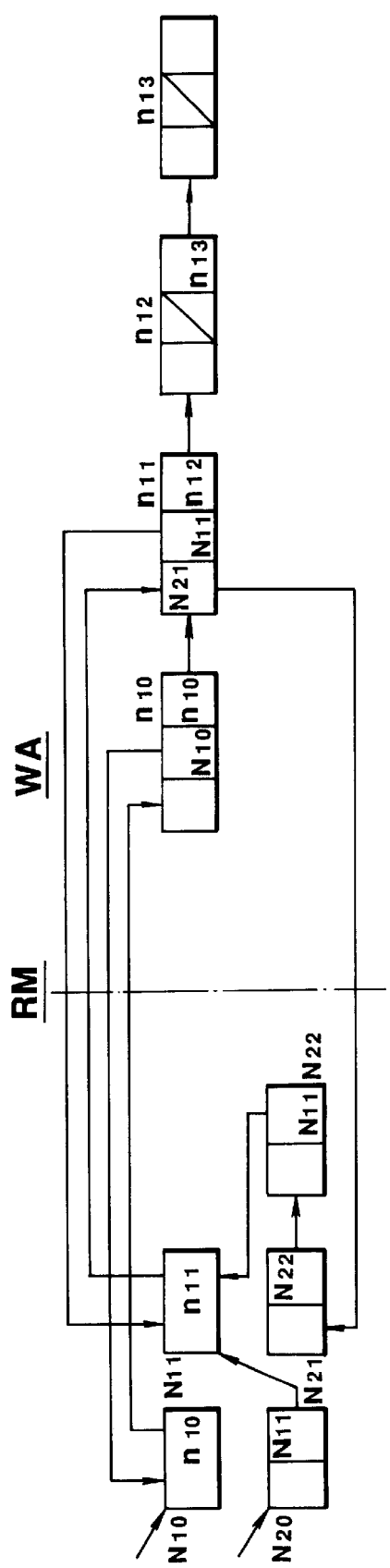

Attention is now directed to the node $N_{11}$ linked to the node $N_{10}$ in the real memory space RM and, as shown in FIG. 10B, a node $n_{11}$ having a reverse reference pointer indicating a link to the node $N_{11}$ by a real memory space address and reverse reference pointers indicating links to the nodes $N_{12}$, $N_{21}$ linked by the pointer of the node $N_{11}$ by real memory space addresses is provided on the work area WA. The indirect pointer indicating the link to the node $n_{11}$ of the work area WA is established in the node $N_{11}$. As shown in FIG. 10C, the link to the node N12 in the real memory space RM by the pointer the node $n_{10}$ of the work area WA is transferred to the link to the aforementioned node $n_{12}$ of the work area WA corresponding to the aforementioned node $N_{12}$. The reverse reference pointer to the node $N_{12}$ (FIG. 10B) is changed in FIG. 10C to a pointer representing the link to the node $n_{11}$ by the virtual memory space address.

Figure 10D:
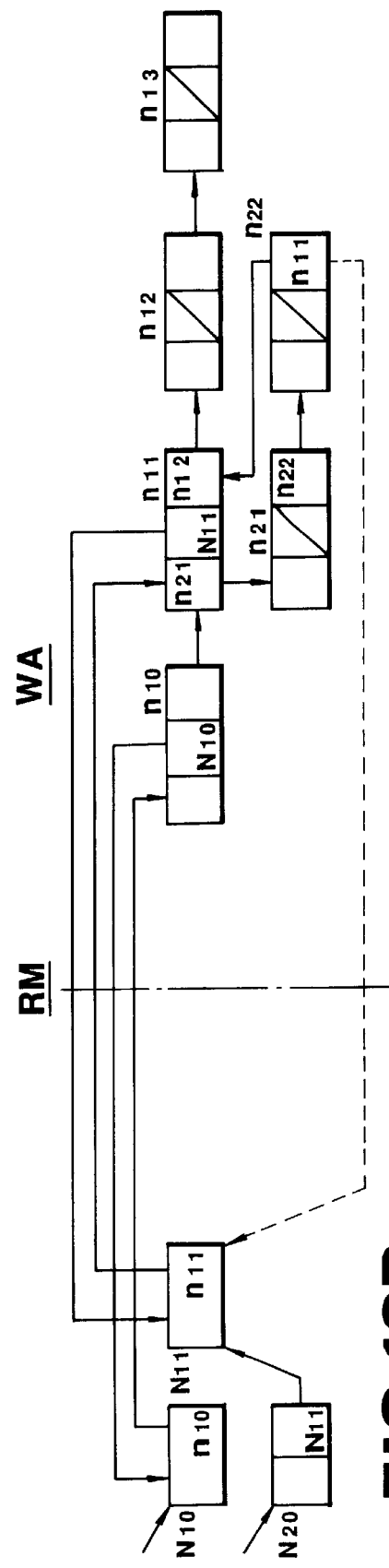

Referring to FIG. 10D, attention is now directed to the node $N_{21}$ in the real memory space RM linked by the reverse reference pointer of the node nll of the work area WA. By tracing the link to the node $N_{22}$ by the pointer of the node $N_{21}$, the nodes $N_{21}$, $N_{22}$ in the real memory space RM are transferred to the work area WA to establish the node $n_{21}$ linked by the pointer of the node $n_{11}$ and the node $n_{22}$ linked by the pointer of the node $n_{22}$ in the work area WA. In addition, the link to the node $N_{11}$ in the real memory space RM by the reverse reference pointer of the aforementioned node $n_{22}$ of the work area WA is exchanged for a link to the aforementioned node $n_{11}$ of the work area WA corresponding to the aforementioned node $N_{11}$.

Figure 10E:
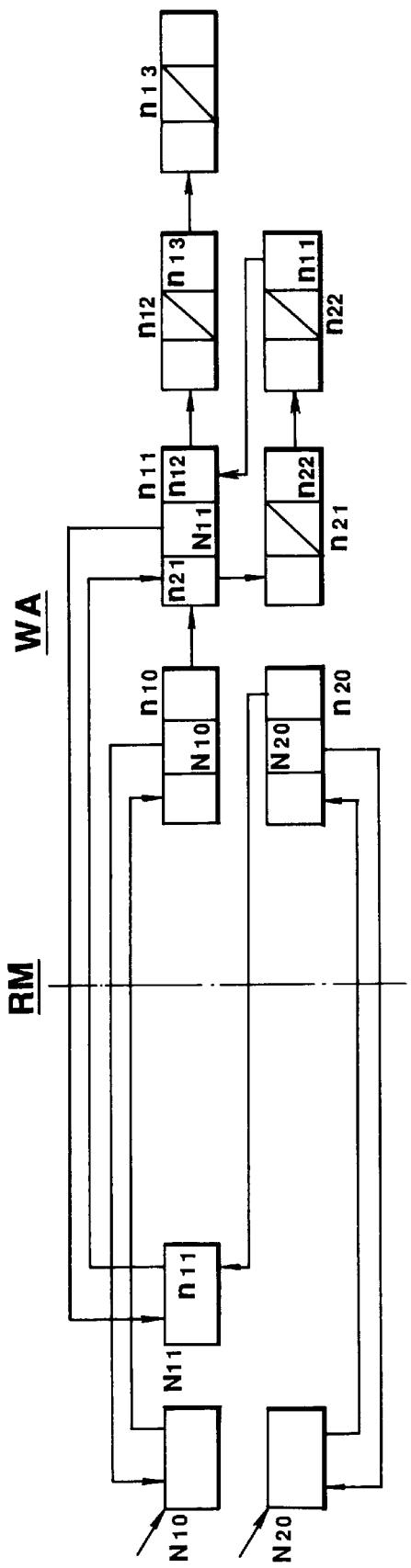

Referring not to FIG. 10E, with attention being directed to an unswept node $N_{20}$ at the other start position of the list structure unit $U_{10}$ in the real memory space RM, a node $n_{20}$ having a reverse reference pointer representing the link to the node $N_{20}$ by the real memory space address and the reverse reference pointer indicating the link to the node $N_{11}$ linked by the pointer of the aforementioned node $N_{20}$ by the real memory space address is provided in the work area WA, while the indirect pointer indicating the link to the node $n_{20}$ is established in the node $N_{20}$ in the real memory space RM.

Figure 10F:
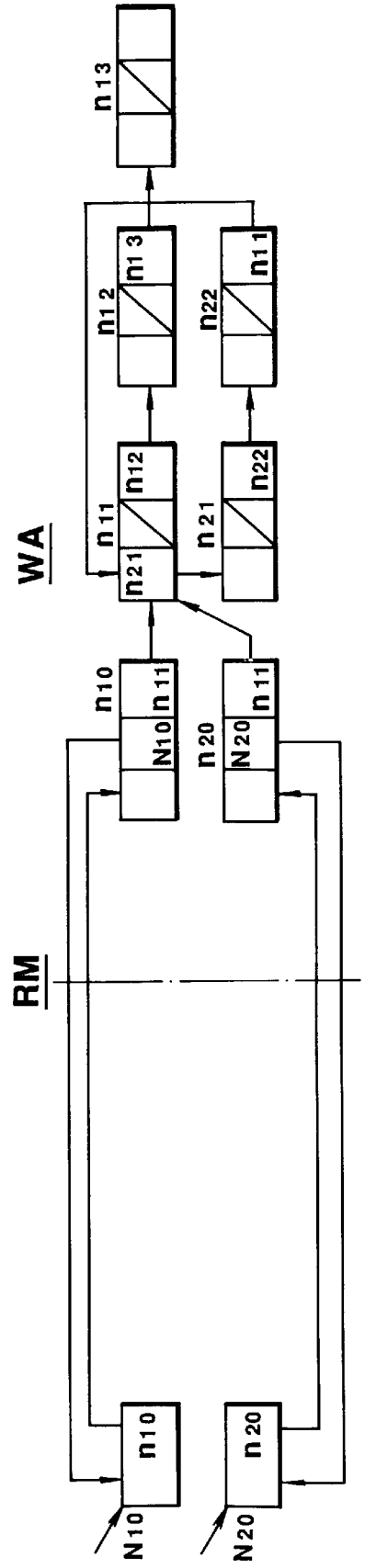

As shown in FIG. 10F, the link to the node $N_{11}$ in the real memory space RM by the reverse reference pointer of the node $n_{20}$ of the work area WA is exchanged for the link to the node $n_{11}$ of the work area WA corresponding to the node $N_{11}$ to thereby shift the node $N_{11}$ in the real memory space RM to the node $n_{11}$ of the work area WA to terminate listing-out of the list structure unit $U_{10}$ into the work area WA in the real memory space RM.

Figure 11:
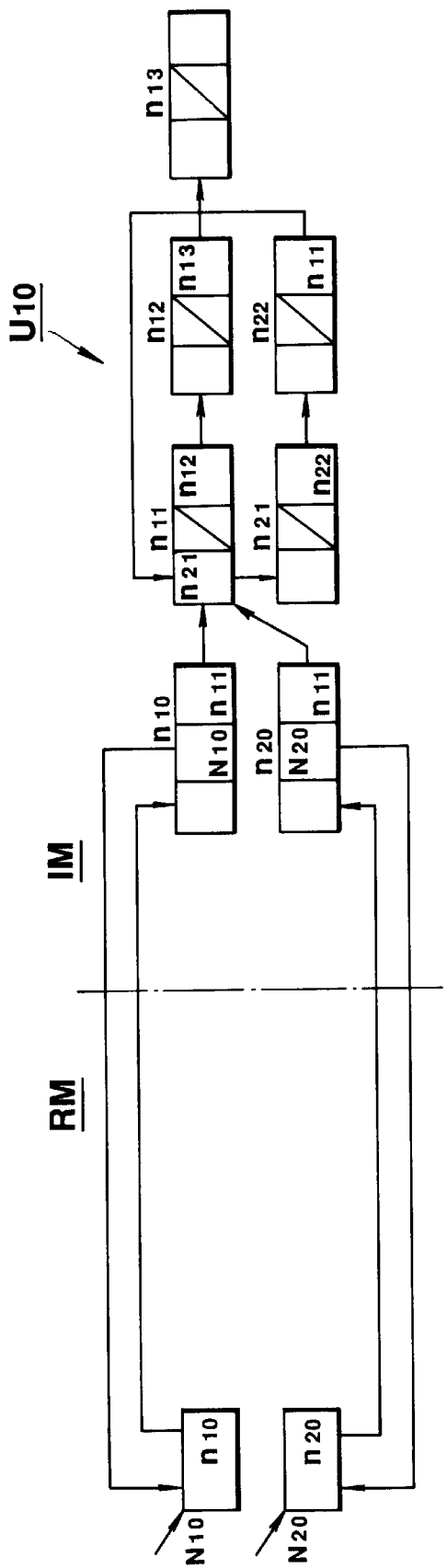
FIG. 11 is a diagram showing the state of listing out of the list structure unit shown in FIG. 9 from the real memory space into the virtual memory space.

Ultimately, by swapping out data of the list structure unit $U_{10}$ from the work area WA in the real memory space RM by the main memory 3 to the virtual memory space IM by the secondary memory 4, the list structure unit $U_{10}$ is listed out to the virtual memory space IM as shown in FIG. 11.

Thus, with the use of the indirect pointer, the cyclic list structure such as the aforementioned list structure unit $U_{10}$ may be listed out successfully and, by the swapping out the data of the list structure unit listed out in the real memory space RM by the main memory 3 from the real memory space RM to the virtual memory space IM by the secondary memory 4, listing out to the virtual memory space IM may be accomplished efficiently and promptly.

The usual pointers directly indicating the links in the memory spaces, that is indicating the link to the node in the real memory space RM by the real memory space address and indicating the link to the node in the virtual memory space IM by the virtual memory space address, may be distinguished from the indirect pointers of the nodes $N_{11}$, $N_{12}$ in the real memory space RM indicating the virtual memory space addresses of the nodes in the virtual memory space IM or the reverse reference pointers of the nodes $n_{10}$, $n_{11}$ in the virtual memory space IM indicating the links to the nodes on the real memory space RM by the real memory space address, from the contents of a tag (not shown) which is annexed to the pointer and which indicates the kind of the node indicated by the pointer.

Next, a list in process is described. When the node desired to be accessed is not in the real memory space RM, but instead is a node in the virtual memory space IM, indicated by the indirect pointer, the listing-in from the virtual memory space IM by the secondary memory 4 to the real memory space RM by the main memory 3 is performed in the following manner.

Figure 12:
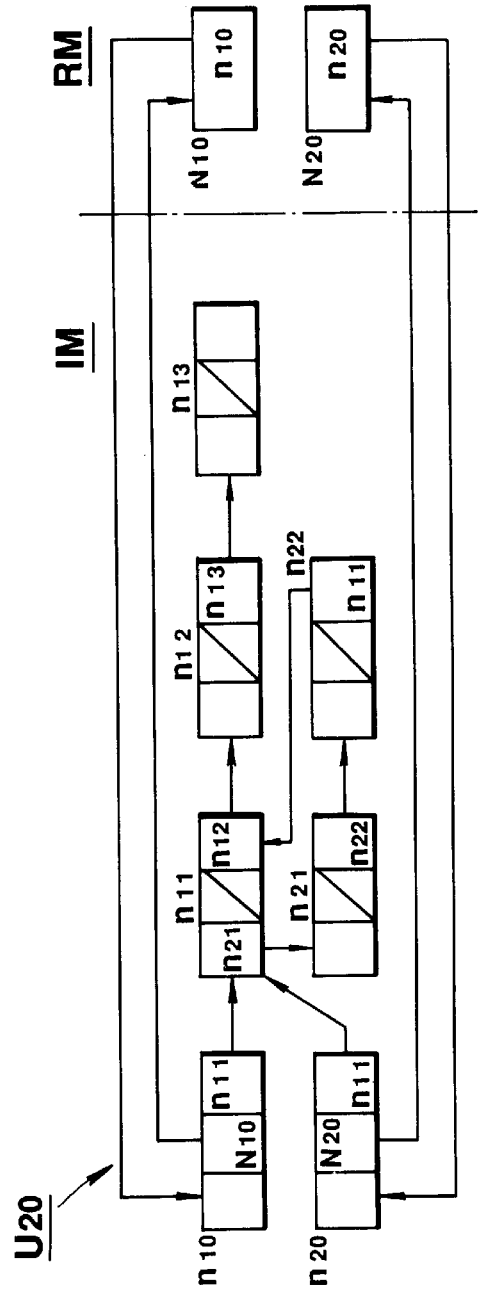
FIG. 12 is a diagram showing a constructional example of a list structure unit for listing-in from the virtual memory space into the virtual memory space.

The following explanation is given for the case in which, as shown in FIG. 12, the list structure unit $U_{20}$ by the nodes $n_{10}$, $n_{11}$, $n_{12}$, $n_{13}$, $n_{20}$, $n_{21}$ and $n_{22}$ in the virtual memory space IM, is linked by the indirect pointers of the nodes $N_{10}$, $N_{20}$ in the real memory space RM. In this case, the data of the list structure unit $U_{20}$ are swapped to the work area WA in the real memory space RM and, in the real memory space RM, listing-in of the list structure unit $U_{20}$ from the work area WA is performed in accordance with a procedure shown in FIGS. 13A to 13D.

Figure 13A:
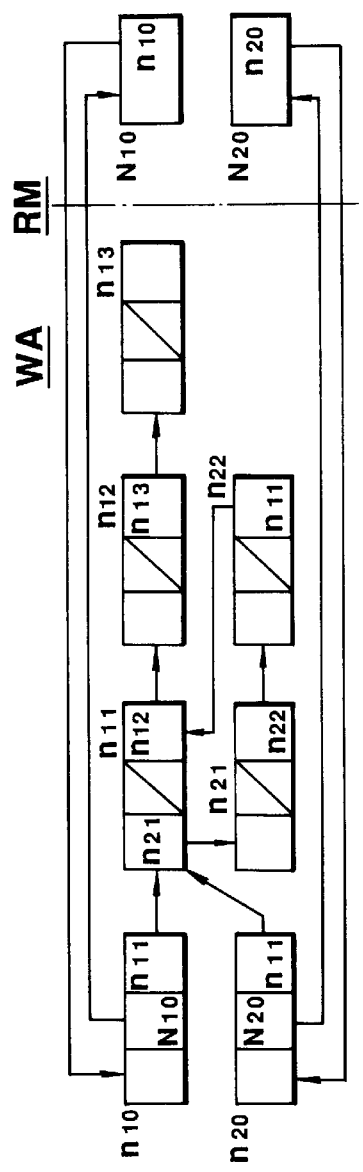
Figure 13B:
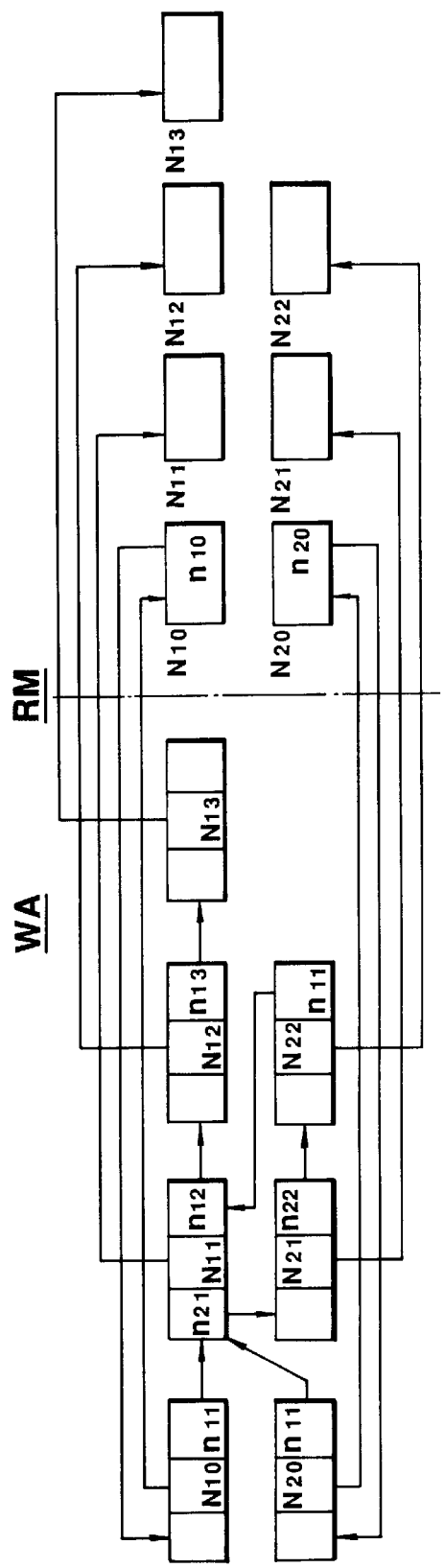

That is, the list structure unit $U_{20}$ of the above mentioned work area WA, shown in FIG. 13A, swapped from the virtual memory space IM to the real memory area RM, is swept, while, as shown in FIG. 13B, reverse reference pointers are established in the nodes $n_{11}$ $n_{12}$, $n_{13}$, $n_{21}$ and $n_{22}$, constituting the list structure unit $U_{20}$, and the nodes $N_{11}$, $N_{12}$, $N_{13}$, $N_{21}$ and $N_{22}$ are provided in the real memory space RM.

The list structure unit $U_{20}$ is again swept and, as shown in FIG. 13C, the pointers represented by the virtual memory space addresses of the nodes $n_{10}$, $n_{11}$, $n_{12}$, $n_{13}$, $n_{20}$, $n_{21}$ and $n_{22}$ constituting the above mentioned list structure unit $U_{20}$ of the work area WA are exchanged for reverse reference pointers by the real memory space addresses for linking to the nodes, $N_{11}$, $N_{12}$, $N_{13}$, $N_{21}$, and $N_{22}$ in the real memory space RM.

The list structure unit $U_{20}$ is then swept a third time and, as shown in FIG. 13D, the contents of the nodes $n_{10}$, $n_{11}$, $n_{12}$, $n_{13}$, $n_{20}$, $n_{21}$ and $n_{22}$ constituting the list structure unit $U_{20}$ of the work area WA are transferred to the nodes $N_{10}$, $N_{11}$, $N_{12}$, $N_{13}$, $N_{20}$, $N_{21}$ and $N_{22}$ in the real memory space RM to transfer the list structure unit $U_{20}$ in its entirety from the work area WA to the real memory space RM to terminate listing-in of the list structure unit $U_{20}$ from the virtual memory space IM by the secondary memory area 4 to the real memory space RM by the main memory 3.

The listing-in from the virtual memory space IM to the real memory space RM may be achieved by a method similar to that of listing out from the real memory space RM to the virtual memory space IM.

Figure 14:
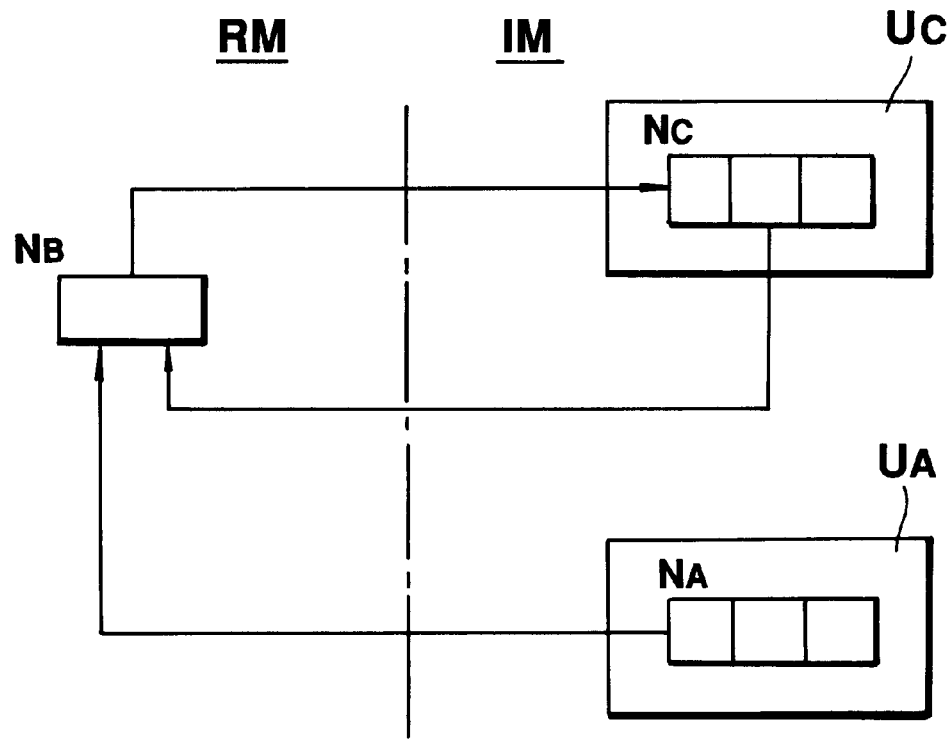
FIG. 14 is a diagram showing a list structure with a remnant indirect pointer in the real memory space as a result of listing-out.
Figure 15:
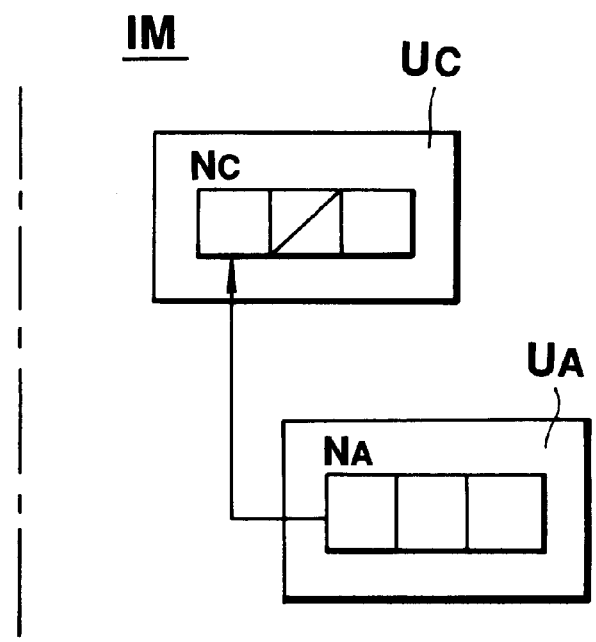
FIG. 15 is a schematic showing a list structure in which the indirect pointer shown in FIG. 14 has been deleted.

When the real memory space RM of the main memory 3 is enlarged in processing by the virtual memory space IM of the secondary memory, referencing from the node of the list structure unit listed out in the virtual memory space IM to the node in the real memory space RM occurs frequently. For example, as shown in FIG. 14, it may occur that the node $N_B$ in the real memory space RM referenced from the node $N_A$ of the list structure unit $U_A$ in the virtual memory space IM is not referenced from any other nodes in the real memory space RM but turns out to be an indirect pointer to the node $N_C$ of the list structure unit $U_C$ in the virtual memory space IM. In such case, referencing to the node $N_B$ in the real memory space RM from the virtual memory space IM may be rewritten to delete the indirect pointer to increase the number of free nodes in the real memory space, as shown in FIG. 15.

The above mentioned sequence of operations for deleting the indirect pointers may be realized, as a principle, by preparing a reverse reference table to each indirect pointer and by rewriting the referencing to the corresponding indirect pointer in the listed-out list structure unit at the listing-out time. Since this procedure contains operations of handling list structures in the virtual memory space, the amount of accessing to the virtual memory space with long accessing time is increased.

Figure 16A:
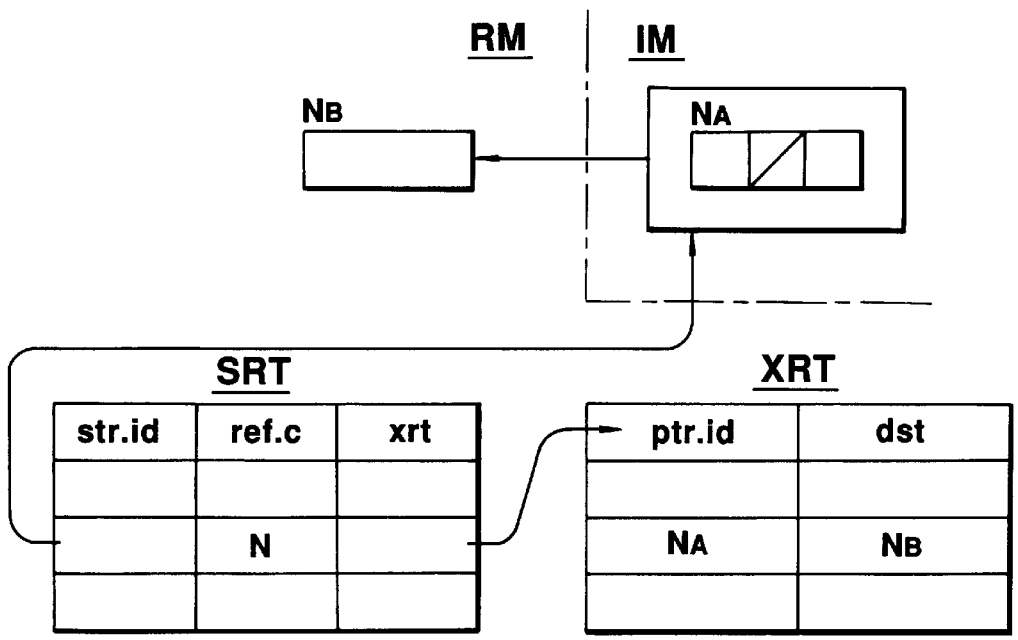
FIGS. 16A and 16B are a diagram showing the organization of various reference tables used for collective control of the list structure units listed out in the virtual memory space.
Figure 16B:
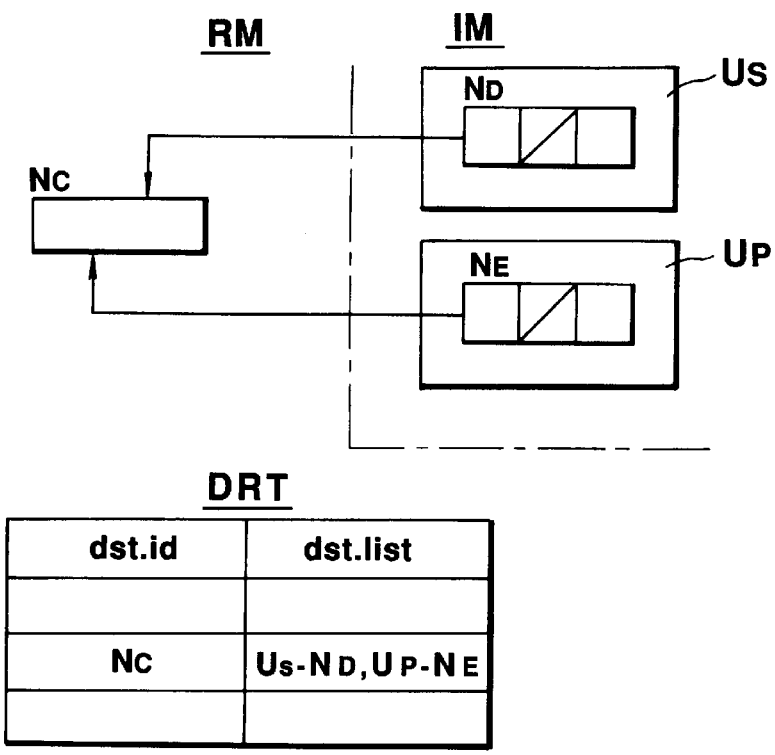

Thus, with this system, as shown in FIG. 16A, there are provided a structure reference table SRT for collectively controlling the list structure units listed out to the virtual memory space IM and an external reference table XRT for controlling the referencing to external nodes by the list structure unit listed out into the virtual memory space IM. There is also provided a reverse referencing table DRT (see FIG. 16B) for controlling the referencing from the virtual memory space IM to the real memory space RM for collectively handling referencing between the list structure units listed out into the virtual memory space to reduce the amount of accessing to the virtual memory space IM.

The structure reference table SRT contains data srt.id for specifying each list structure unit listed out to the virtual memory space RM, the number of times ref.c of the references from the outside to the nodes of the list structure units, and pointers xrt to the external reference table XRT, and is used for controlling or retrieving of the external reference table XRT. The external reference table XRT contains data ptr.id allocated to each listed-out list structure unit and specifying the mode referencing to outside in the corresponding list structure unit, and pointers dst specifying the external nodes to which the node is referencing. The reverse reference table DRT contains data dst.list specifying the nodes in the virtual memory space IM referencing to the nodes in the real memory space RM with the list structures as units and data dst.id specifying the nodes on the real memory space RM. See FIGS. 16A and 16B.

In making entries to the reference tables SRT, XRT and DRT, it suffices to hash the structure reference table SRT, external reference table XRT and the reverse reference table DRT by the structure number of the list structure unit, instructure addresses of the list structure unit and by the real memory space addresses, respectively, and high speed retrieval of the reference tables SRT, XRT or DRT may be realized. Although hashing to the reverse reference table DRT cannot be made if no reference node exists in the real memory space, the reverse reference pointers from the nodes of the list structure unit in the virtual memory space may be used as entries to the reverse reference table DRT.

Although the binary tree type list structure data are controlled in the above embodiment, the list structure data that may be handled in the data control system according to the present invention are not limited to a binary tree type list structure data, but may be expanded to n-nary type list structure data. On the other hand, the data control system according to the present invention may be applied not only to the multi-processor system such as described in the above embodiment, but to a generalized processor system as well.

As described above, with the data control system of the present invention, the pointers are indicated by the addresses in the real memory space and by the addresses in the virtual memory space and the addresses to the real memory space in the virtual memory space, and nodes in the virtual memory space are indirectly referenced from the nodes in the real memory space, so that data of a structure in which nearby nodes are linked by pointers are represented across the real memory space and the virtual memory space to obviate the necessity of representing the whole memory area by pointers to achieve a saving in memory capacity so as to effectively increase the memory capacity.

Also, with the data control system of the present invention, data of the structure in which the near-by nodes are linked by the pointers are moved between the real memory space and the virtual memory space with the use of the link data and with the list structures as units, so that dynamic data may be controlled without statically splitting the dynamic data and with the dynamic data remaining unchanged, with the result that the number of times of accessing to the virtual memory space may be reduced to improve the memory accessing efficiency significantly. Above all, the efficiency of garbage collection may be improved significantly with extremely high effects.

Hence, with the use of the data control system of the present invention, virtualization of the list structure data which are basic and indispensable in the field of symbol manipulation such as artificial intelligence, formula manipulation or natural language manipulation may be realized efficiently.

What is claimed is:

1. A data control system for a computer's main memory for efficiently realizing virtualization of list structure data lying across a real memory space and a virtual memory space, comprising:

a real memory space having nodes linked by pointers, with the pointers being represented by addresses in the real memory space;

a virtual memory space having nodes linked by pointers, with the pointers being represented by addresses in the virtual memory space and addresses to the real memory space, and wherein the nodes in the virtual memory space are referenced to the nodes in the real memory space by indirect pointers represented by addresses of pointers in the real memory space and addresses of pointers in the virtual memory space; and means for moving the list structure data between the real memory space and the virtual memory space as list structure units.

2. A data control method for use with a computer's main memory for efficiently realizing virtualization of list structure data lying across a real memory space and a virtual memory space, comprising the steps of:

(a) listing a list structure unit by moving nodes in the real memory space to a work area in the real memory space and then transferring data of the list structure unit from the work area in the real memory space to a work area in the virtual memory space, so that the list structure unit is listed-out to the virtual memory space; and (b) listing the list structure unit from the virtual memory space to the real memory space.

* * * * *